United States Patent
Daniel et al.

(10) Patent No.: US 10,853,349 B2
(45) Date of Patent: Dec. 1, 2020

(54) EVENT BASED ANALYTICS DATABASE SYNCHRONIZATION

(71) Applicant: VMWARE, INC., Palo Alto, CA (US)

(72) Inventors: Zundra Vennaldo Daniel, Atlanta, GA (US); Joshua Glenn Broch, Palo Alto, CA (US); Liny Chandran, Bangalore (IN); Abhishek Mishra, Atlanta, GA (US); Manu Nazareth, Atlanta, GA (US); Sangeeta Soman, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 236 days.

(21) Appl. No.: 15/865,264

(22) Filed: Jan. 9, 2018

(65) Prior Publication Data

US 2019/0050441 A1    Feb. 14, 2019

(30) Foreign Application Priority Data

Aug. 9, 2017    (IN) .............................. 201741028279

(51) Int. Cl.
*G06F 16/23*    (2019.01)
*G06F 9/46*    (2006.01)
(Continued)

(52) U.S. Cl.
CPC .......... *G06F 16/2358* (2019.01); *G06F 9/466* (2013.01); *G06F 16/23* (2019.01);
(Continued)

(58) Field of Classification Search
CPC ...... G06F 8/65; G06F 16/951; G06F 11/3051; G06F 16/2365; G06F 1/3206; G06F 8/41;
(Continued)

(56) References Cited

U.S. PATENT DOCUMENTS 6,434,544 B1    8/2002  Bakalash et al.
7,509,671 B1    3/2009  Bedell et al.
(Continued)

OTHER PUBLICATIONS

Conn, Samuel S. "OLTP and OLAP data integration: a review of feasible implementation methods and architectures for real time data analysis." In Proceedings. IEEE SoutheastCon, 2005., pp. 515-520. IEEE, 2005. (Year: 2005).

*Primary Examiner* — Angelica Ruiz
(74) *Attorney, Agent, or Firm* — Thomas | Horstemeyer, LLP (57) ABSTRACT

Event based analytics database synchronization is described. In one example, an event tracking engine can sequence through batches of records in a transactional database that is being synchronized to an analytics database. The event tracking engine can determine a last version attribute associated with the batch, and query the transactional database to identify any records for the batch having a more recent version attribute than the last version attribute. When any records in the transactional database having a more recent version attribute are identified, the event tracking engine finds the data values in the record are different than those in the analytics database. The data values can be normalized, for example, before being forwarded to an analytics system for incorporation into the a analytics database. Over time, changes in the transactional database are identified and populated or mirrored in the analytics database.

20 Claims, 4 Drawing Sheets

(51) Int. Cl.
*G06F 16/2455* (2019.01)
*G06F 16/25* (2019.01)

(52) U.S. Cl.
CPC ...... *G06F 16/2365* (2019.01); *G06F 16/2455* (2019.01); *G06F 16/254* (2019.01)

(58) Field of Classification Search
CPC ...... G06F 8/43; G06F 11/3006; G06F 11/302; G06F 11/34; G06F 16/64; G06F 16/68
USPC ........... 707/600–831, 899, 999.001–999.206
See application file for complete search history.

(56) References Cited

U.S. PATENT DOCUMENTS

| | | | |
|---|---|---|---|
| 10,067,838 B1* | 9/2018 | Keeriyadath | G06F 9/45558 |
| 2005/0071341 A1 | 3/2005 | Chkodrov et al. | |
| 2007/0027904 A1 | 2/2007 | Chow et al. | |
| 2008/0074284 A1* | 3/2008 | Edwards | G01D 4/002 |
| | | | 340/870.02 |
| 2009/0112939 A1* | 4/2009 | Sanghvi | G06F 16/273 |
| 2009/0271384 A1 | 10/2009 | Bakalash et al. | |
| 2010/0030777 A1* | 2/2010 | Panwar | G06Q 10/087 |
| | | | 707/600 |
| 2010/0082396 A1* | 4/2010 | Caldwell | G06Q 10/06 |
| | | | 705/7.16 |
| 2010/0153154 A1* | 6/2010 | Bergantino | G06Q 10/06 |
| | | | 705/7.11 |
| 2013/0073513 A1 | 3/2013 | Kemper et al. | |
| 2014/0280913 A1* | 9/2014 | Karren | G06F 21/305 |
| | | | 709/224 |
| 2015/0358391 A1* | 12/2015 | Moon | G06F 11/3409 |
| | | | 709/224 |
| 2016/0242024 A1* | 8/2016 | Karren | H04W 4/60 |
| 2016/0306827 A1* | 10/2016 | Dos Santos | G06F 16/25 |
| 2016/0330219 A1* | 11/2016 | Hasan | H04L 63/1408 |
| 2017/0118211 A1* | 4/2017 | Murthy | G06F 8/61 |
| 2018/0196878 A1 | 7/2018 | Iball et al. | |
| 2019/0050441 A1 | 2/2019 | Daniel et al. | |

\* cited by examiner

EVENT BASED ANALYTICS DATABASE SYNCHRONIZATION

RELATED APPLICATIONS

Benefit is claimed under 35 U.S.C. 119(a)-(d) to Foreign Application Serial No. 201741028279 filed in India entitled "EVENT BASED ANALYTICS DATABASE SYNCHRONIZATION", on Aug. 9, 2017, by VMware, Inc., which is herein incorporated in its entirety by reference for all purposes.

The present application is related in subject matter to U.S. patent application Ser. No. 15/865,288, filed Jan. 9, 2018 and entitled EVENT BASED ANALYTICS DATABASE SYNCHRONIZATION, which is incorporated herein by reference.

BACKGROUND

Online transaction processing (OLTP) databases are designed for relatively large numbers of short transactions (e.g., insert, update, delete, and others) and queries. OLTP databases are typically relied upon by thousands of applications (or more) executed concurrently on devices. Thus, OLTP databases are designed for fast query processing, data integrity in multi-access environments, and high numbers of transactions per second. OLTP databases are also managed for availability, speed, and recoverability. The structure and organization of OLTP databases can be defined through relatively complex schema. In that context, "schema" refers to the manner or construct in which data is organized or, in the context of relational databases, divided into tables for databases. A schema can define the logical constraints imposed on the organization of and access to a database.

A relational database management system (RDBMS) is a database management system (DBMS) commonly used for OLTP databases. The structured query language (SQL) defines the standard syntax language for access to RDBMSs. In an RDBMS, data is stored in database objects, such as tables including records. Tables can be representatively considered as collections of related data entries and consisting of numerous rows and columns.

RDBMSs have been common for storing financial records, manufacturing and logistical information, personnel data, and other types of data for decades. To a great extent, relational databases have replaced hierarchical and network databases because they can be easier to understand and use. Although competing organizational structures and frameworks of databases have challenged the widespread use of relational databases, RDBMSs have grown market adoption over the years.

Online analytical processing (OLAP) databases are based on multidimensional organizational data models, allowing for complex analytical and ad hoc queries. The structure and organization of OLAP databases can be defined through relatively schema-less constructs. OLAP tools are directed to analyzing multidimensional data interactively from multiple perspectives. OLAP tools are useful for analyzing multi-dimensional analytical (MDA) queries swiftly through computing systems for business intelligence and other purposes. Example applications for OLAP include business reporting for sales, marketing, management, financing, and other purposes. OLAP databases can be contrasted with OLTP databases, as OLAP databases are generally described for use with more complex queries, in fewer numbers, to process transactions for business intelligence or reporting.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

Enterprise-level mobile device management (MDM) platforms can be relied upon to facilitate the management of large numbers of devices, including desktop, laptop, and mobile devices. For example, the enrollment and association of users to mobile devices can be facilitated by MDM platforms. Similarly, the distribution, installation, and access to applications on a number of mobile devices can be managed by MDM platforms. Device management policies, compliance rules, and configurations can be enforced by MDM platforms through access, application, and feature/function controls on the devices.

Just as in other fields and industries, enterprise-level MDM platforms can rely upon RDMBS-based OLTP databases. Further, just as in other fields, there is a need to gather business intelligence and analytics from MDM platforms. Examples of such business intelligence and analytics include lists of applications present on all mobile devices for companies or business teams within companies, lists of memory requirements for such applications, lists of which applications comply with company profiles and/or requirements, and other information.

As outlined above, OLTP databases are designed for relatively large numbers of short transactions and queries. OLTP databases are designed for fast query processing, data integrity in multi-access environments, and high numbers of transactions per second. On the other hand, OLAP databases are based on multidimensional organizational data models, allowing for complex analytical and ad hoc queries. The structure and organization of OLAP databases can be defined through relatively schema-less constructs as compared with OLTP databases.

After an OLTP database is defined and populated with data, the need for business intelligence and analytics can lead to the need to mirror the data in an OLAP database. It can take a significant amount of time and processing overhead, however, to retrieve data from an OLTP database, normalize it, and store it to an OLAP database. Thus, it can be common for business intelligence to be generated based on data that is one or two days old.

In the context outlined above, aspects of event based database synchronization are described herein. For example, data stored in an OLTP (e.g., transactional) or similar database, which is defined according to a particular schema, can be ported and synchronized to a relatively schema-less OLAP analytics database for the purpose of conducting business intelligence and analytics processing. To that end, an event tracking engine can determine a last version attribute associated with a batch of records in the transactional database, and query the transactional database to identify at least one record for the batch having a more recent version attribute than the last version attribute. When a record in the transactional database having a more recent version attribute is identified, the event tracking engine finds the data values in the record which are different than those in the analytics database. The data values can be normalized, for example, before being forwarded to an analytics system for incorporation into the analytics database. Over time, changes in the transactional database are identified by the event tracking engine, and those changes are populated or mirrored in the analytics database.

Figure 1:
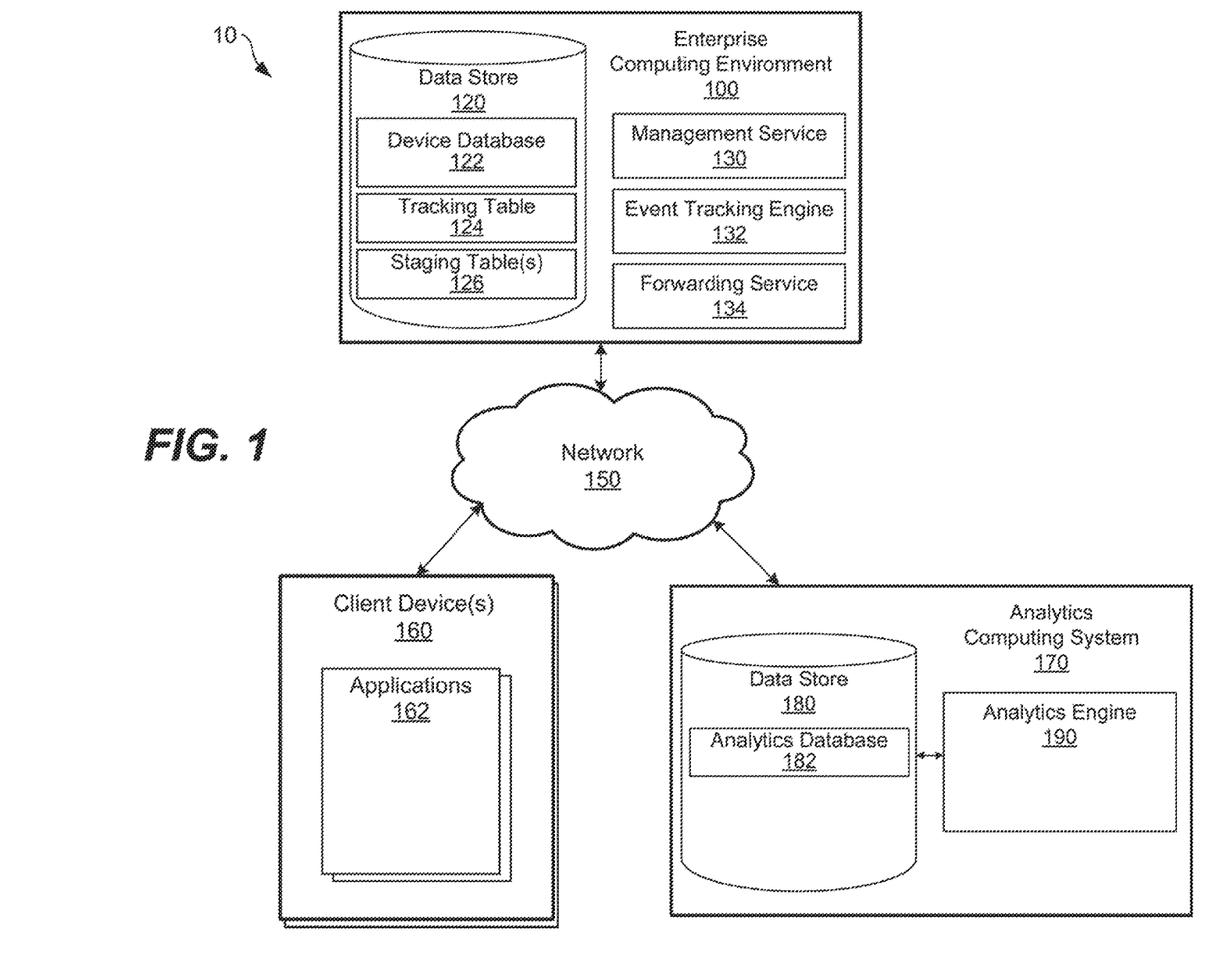
FIG. 1 illustrates an example networked environment for event based analytics database synchronization according to various examples described herein.

Turning to the drawings, the following paragraphs provide an outline of a networked environment followed by a discussion of the operation of the same. FIG. 1 illustrates an example networked environment 10 for event based analytics database synchronization according to various examples described herein. The networked environment 10 includes an enterprise computing environment 100, a network 150, a number of client devices 160, and an analytics computing system 170. Aspects of event based analytics database synchronization are described below with reference to the enterprise computing environment 100, the client devices 160, and the analytics computing system 170, but those components are representative and other networked environments and components can perform the concepts described herein.

The enterprise computing environment 100 can be embodied as one or more computers, computing devices, or computing systems. In certain embodiments, the enterprise computing environment 100 can include one or more computing devices arranged, for example, in one or more server or computer banks. The computing device or devices can be located at a single installation site or distributed among different geographical locations. The enterprise computing environment 100 can include a plurality of computing devices that together embody a hosted computing resource, a grid computing resource, or other distributed computing arrangement. In some cases, the enterprise computing environment 100 can be embodied as an elastic computing resource where an allotted capacity of processing, network, storage, or other computing-related resources varies over time. As further described below, the enterprise computing environment 100 can also be embodied, in part, as certain functional or logical (e.g., computer-readable instruction) elements or modules as described herein.

The enterprise computing environment 100 can function as a device management service for any number of devices, including the client devices 160. In that context, the enterprise computing environment 100 includes a data store 120, a management service 130, an event tracking engine 132, and a forwarding service. The data store 120 includes areas in memory for storage of the device database 122, the tracking table 124, and the staging tables 126, among other types of data. In some cases, the staging tables 126 can be logically defined as a number of tables in the device database 122, but the staging tables 126 can also be stored separately from the device database 122 in the data store 120. Operational aspects of the enterprise computing environment 100 are described in further detail below.

The network 150 can include the Internet, intranets, extranets, wide area networks (WANs), local area networks (LANs), wired networks, wireless networks, cable networks, satellite networks, other suitable networks, or any combinations thereof. As one example, the enterprise computing environment 100, the client devices 160, and the analytics computing system 170 can be respectively coupled to one or more public or private LANs or WANs and, in turn, to the Internet for communication of data among each other. Although not shown in FIG. 1, the network 150 can also include communicative connections to any number and type of network hosts or devices, such as website servers, file servers, cloud computing resources, databases, data stores, or any other network or computing architectures.

In the networked environment 10, the enterprise computing environment 100, the client devices 160, and the analytics computing system 170 can communicate data among each other using one or more network transfer protocols or interconnect frameworks, such as hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), internet protocol (IP), transmission control protocol (TCP), other protocols and interconnect frameworks, and combinations thereof.

The client devices 160 are representative of one or more client devices. The client device 160 can be embodied as any computing device, processing circuit, or processor based device or system, including those in the form of a desktop computer, a laptop computer, a tablet computer, a personal digital assistant, a cellular telephone, a wearable computing device, or a set-top box, among other example computing devices and systems. Depending upon its primary purpose or function, for example, the client device 160 can include various peripheral devices or components. The peripheral devices can include input or communications devices or modules, such as keyboards, keypads, touch pads, touch screens, microphones, cameras, wireless communications modules (e.g., infra-red, WI-FI, or BLUETOOTH®), buttons, switches, or sensors. The peripheral devices can also include a display, indicator lights, speakers, global positioning system (GPS) circuitry, accelerometers, gyroscopes, or other peripheral devices depending upon the primary purpose or function of the client device 160.

As illustrated in FIG. 1, the client device 160 includes the applications 162. The applications 162 are representative of applications, application extensions, or other application-related components that can be executed on the client device 160. The applications 162 can include hypertext-based network browsers, such as the Internet Explorer®, Firefox®, Chrome®, Safari®, or Silk® browsers, among other types of browsers. Additionally, the applications 162 can be embodied as other types of applications, such as an e-mail clients, messaging clients, document editors or viewers, file browsers, and other applications for other purposes.

The analytics computing system 170 can be embodied as one or more computers, computing devices, or computing systems similar to the enterprise computing environment 100. The analytics computing system 170 can be geographically separated from the enterprise computing environment 100 or, in some cases, reside at the same location as the enterprise computing environment 100. The analytics computing system 170 can gather and generate business-intelligence-related reports on the basis of data gathered by the enterprise computing environment 100, including data related to the status, performance, and use of the client devices 160. The analytics computing system 170 includes a data store 180 and an analytics engine 190. The data store 120 includes an area in memory for storage of the analytics database, among other types of data.

Turning back to aspects of the enterprise computing environment 100, the management service 130 can be configured to operate as a mobile device manager for one or more of the client devices 160. During a device management enrollment process, the management service 130 can remotely configure one or more of the client devices 160 for device management. To that end, the management service 130 can coordinate with the operating systems of the client devices 160 (and/or management agents executing on the client devices 160) to register and configure the client devices 160 for device management.

As part of the device management enrollment process (and even after enrollment has concluded), the management service 130 can install and uninstall certain software components on the client devices 160. The software components can include applications, resources, libraries, drivers, device configurations, and other related components. The management service 130 can also transfer device management data, including management policies, compliance rules, configuration data, and other policies and rules to the client devices 160. During and after this enrollment process, the management service 130 can gather various types of data related to the status, use, and management of the client devices 160. The data can be associated with hardware, software, user, network, and other aspects of the status, use, and management of the client devices 160. The data can be stored by the management service 130 in the device database 122 for reference and processing in connection with device management.

The device database 122 can be embodied as a transactional database to store a number of tables having a number of records defined according to a schema for the purpose of MDM. Thus, as a reference database for device management, the device database 122 can be created, administered, updated, and referenced over time by the management service 130. Access to the device database 122 can be driven by changes or actions which occur on the client devices 160 with relatively high frequency and volume over time. In that context, the device database 122 can be designed as a type of relational or OLTP database for relatively large numbers of short transactions and queries.

The device database 122 can be organized into tables having records of rows, columns, and attributes, for example, according to a schema. Any number of data values can be stored in the tables. As noted above, the device database 122 can be used by the management service 130 to store data related to the status, use, and management of the client devices 160. Among other types of data, the records in the device database 122 can include hardware- and software-related device identifiers, version numbers, serial numbers, and related data of the client devices 160. The data can also include lists of applications, rules, policies, and files installed on the client devices 160, lists of users associated with the client devices 160, application- and device-level resource usage data associated with the client devices 160, and access data associated with the client devices 160, among other data. Thus, over time, the device database 122 can be populated with a significant amount of useful data representative of various operating characteristics and settings of the client devices 160. In operation, the data values stored in the device database 122 are constantly changing over time.

However, the access demands placed on the device database 122 by the management service 130 (and the constraints imposed due to the relational database schema structure of the device database 122) limit the ability to process the data in the device database 122 for the purpose of business intelligence and analytics. To generate another copy of the data stored in the device database 122 for business intelligence and analytics, the event tracking engine 132 is configured to retrieve data from the device database 122 over time, normalize it, and store it to the staging tables 126. In turn, the forwarding service 134 is configured to retrieve the data stored in the staging tables 126 and forward it to the analytics computing system 170. In that way, the event tracking engine 132 is configured to copy the data stored in the device database 122, and the forwarding service 134 is configured to synchronize it with the analytics computing system 170.

The analytics engine 190 of the analytics computing system 170 is configured to receive the data from the forwarding service 134, format it, and store it in the analytics database 182. As compared to the device database 122, the organizational structure of the analytics database 182 can be defined by a relatively schema-less construct (e.g., a type of OLAP database). In some cases, the analytics database 182 can include a number of separate analytics databases, each used for a different purpose, and the analytics engine 190 can store the data received from the forwarding service 134 in each of those databases. The analytics engine 190 is further configured to submit multi-dimensional analytical queries to the analytics database 182 for business intelligence reporting and other purposes. As examples, the analytics engine 190 can gather data from the analytics database 182 and use it to generate reports for sales, marketing, device management, information technology security, and other purposes.

Once an initial import of the data from the device database 122 to the analytics database 182 is complete, the event tracking engine 132 can continue to examine the device database 122 for data change events. Such data change events can include changes in data values in previously-reviewed records, the deletion of previously-reviewed records, the addition of new records, and other events in the device database 122. As the event tracking engine 132 identifies such data change events, any changes to the underlying data values are synchronized to the analytics database 182. During the import and event based synchronization phases, the event tracking engine 132 can reference certain variables and fields in the tracking table 124 to keep track of records, devices, synchronization batch processes, and other data values and processes. The operations of the event tracking engine 132 and the forwarding service 134 are described in further detail below with reference to FIGS. 2, 3A, and 3B.

Figure 2:
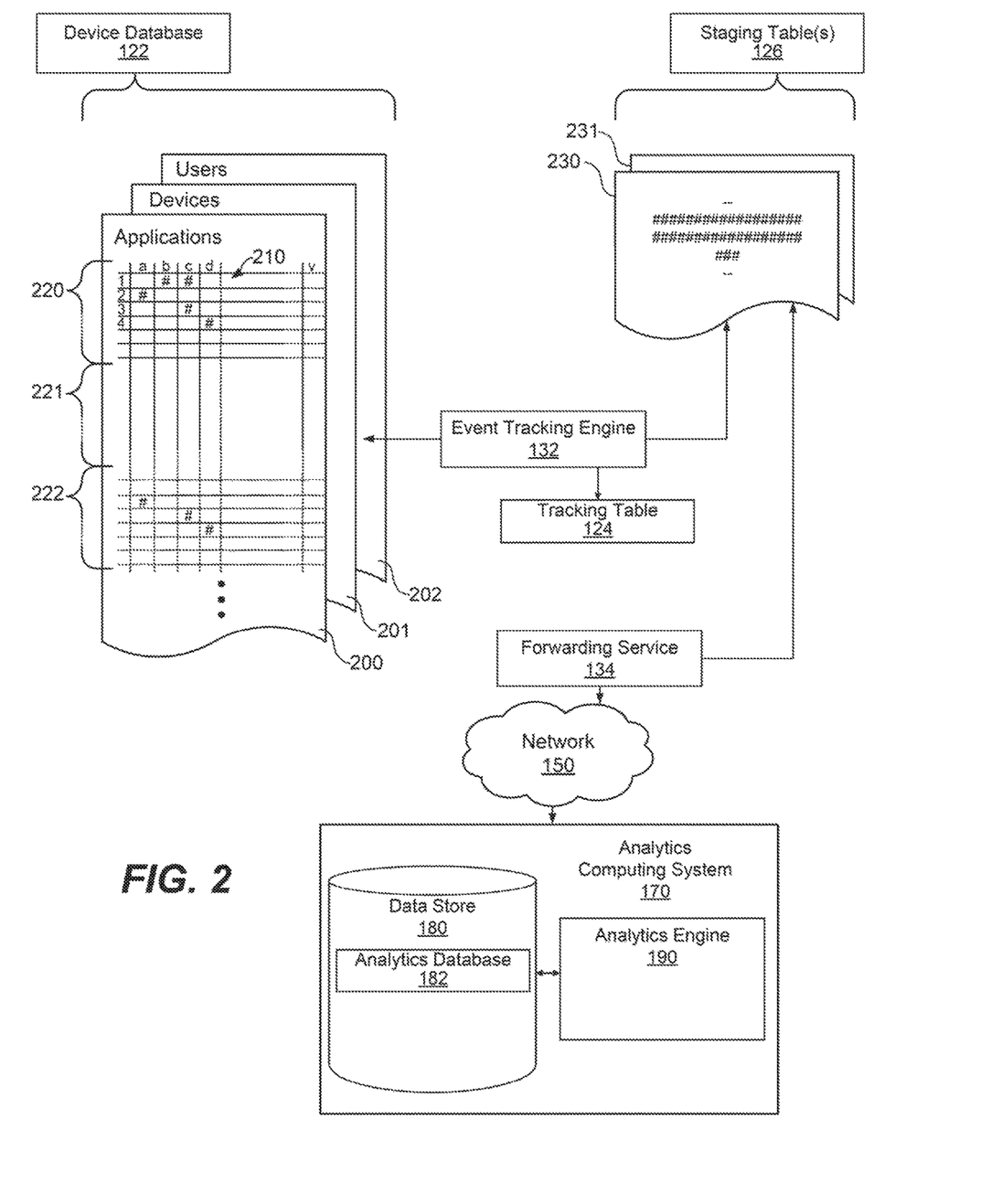
FIG. 2 illustrates a representative example of how a device database can be synchronized with an analytics database in the networked environment shown in FIG. 1, according to various examples described herein.

FIG. 2 illustrates a representative example of how data values in the device database 122 can be synchronized with the analytics database 182 by the event tracking engine 132 and the forwarding service 134. FIG. 2 is presented to provide context for a more detailed description of the operations of the event tracking engine 132 and the forwarding service 134, as provided with reference to FIGS. 3A and 3B.

In FIG. 2, a number of tables 200-202 of the device database 122 are shown. As an example, table 200 is related to a listing of applications present or installed on the client devices 160, table 201 is related to a listing of the client devices 160 and certain operating characteristics of the client devices 160, and table 202 is related to a listing of the users associated with the client devices 160. Further, various records and fields can be logically joined or linked together among the tables 200-202 based on the schema for the device database 122. The device database 122 can, of course, store other types of data rather than and/or in addition to that illustrated in FIG. 2. Additionally, although a logical arrangement of tables and records is illustrated as an example in FIG. 2, the device database 122 can include any number of tables and records organized in any suitable manner depending upon the needs of the management service 130.

One or more of the tables 200-202 can include a number of records each including a number of fields associated with various types of data. As an example, the record 210 in the table 200 can be associated with a list of applications installed on one of the client devices 160. The record 210 is shown as row "1," having columns or fields "a," "b," "c." and so on, to field "v." Data values can be stored in connection with die fields of the records of the tables 200-202. The arrangement of the fields in the records in FIG. 2 is provided as an example, and other suitable arrangements can be used.

As outlined above, the object of the event tracking engine 132 is to populate the analytics database 182 with the data values stored in the device database 122. The event tracking engine 132 can populate the analytics database 182 with the data values from the device database 122 in two main phases, including a first import phase and a second event based synchronization phase. As described in further detail below with reference to FIGS. 3A and 3B, the import phase can be relied upon to populate the analytics database 182 with the data values stored in the device database 122, in bulk, for the first time. After the import phase is complete, the event based synchronization phase can be relied upon to keep the analytics database 182 updated, over time, as data values are added to or changed in the device database 122.

In the import phase, the event tracking engine 132 is configured to retrieve all the data values from the device database 122. In one example case, the data values are retrieved from batches of records in the device database 122. Batches are groups of records, and example hatches 220-222 are shown in FIG. 2. To limit access to (and the burden on) the device database 122, the event tracking engine 132 can be configured to work with batches of 5, 10, 20, or other suitable numbers of records at a time. Thus, the event tracking engine 132 can retrieve all the data values from the device database 122 in the batch 220, for example, before turning to retrieve the data values in the hatch 221, and so on, until all the data values in the device database 122 have been retrieved.

The event tracking engine 132 is also configured to normalize or flatten the data values, as they are retrieved from the device database 122, and copy them to the staging tables 126. In that context, the event tracking engine 132 can formalize or flatten the data values retrieved from the device database 122 by discarding any associated or underlying attributes, such as data type, database schema, inter-record or inter-table reference, or other attributes, from the data values. For certain attributes, rather than being discarded, the attributes are normalized or encoded into another standard data format in connection with the data values. The event tracking engine 132 can flatten the data values into extensible markup language (XML) strings, for example, or other suitable data formats before the data values are stored in the staging tables 126.

As part of the import phase, the event tracking engine 132 (or possibly the management service 130) is also configured to append a version attribute (e.g., column "v" in table 200) to records in the device database 122. The version attribute can be appended to each record in the device database 122, for example, or to one or more records in one or more of the batches 220-222. For each record having a version attribute, the event tracking engine 132 stores a copy of the version attribute in the tracking table 124 for later reference during the event based synchronization stage. Each version attribute can be derived from a timestamp generated by the enterprise computing environment 100 based on when the record associated with the version attribute was last accessed or changed, for example, by the management service 130, the event tracking engine 132, or other relevant processes of the enterprise computing environment 100. The content, purpose, and use of the version attributes are described in further detail below.

Once stored in the staging tables 126, the data values are ready to be forwarded to the analytics computing system 170 by the forwarding service 134. Thus, as data values from the device database 122 are stored in the staging tables 126, the forwarding service 134 is configured to retrieve the data values from the staging tables 126 and forward (e.g., transfer over the network 150) those data values to the analytics computing system 170 for incorporation into the analytics database 182. Once the data values are received by the analytics computing system 170, the data values can be organized into any suitable format by the analytics engine 190, before being stored into the analytics database 182.

In one example case, the event tracking engine 132 first stores any data values from the device database 122 into an event staging table 230. The data values can be appended to the end of the event staging table 230. In turn, the forwarding service 134 reviews the data values stored in the event staging table 230 and copies or moves those data values, in groups, to a jobs staging table 231. The forwarding service 134 then retrieves the data values from the jobs staging table 231 and conducts an application programming interface (API) call to the analytics computing system 170 to transfer the data values using a suitable network protocol over the network 150. Even after the import phase is complete, the forwarding service 134 can continue to check the staging tables 126 to identify whether any new or updated data values have been stored in the staging tables 126 by the event tracking engine 132, as will be discussed in further detail below.

After the import phase is complete, the event tracking engine 132 is configured to survey individual batches 220-222 of the records in the device database 122, over time, to identify any updated-data events. Such events can occur if one or more data values in the table 200 (or the tables 201 and 202) were updated to include new or different data, for example, as compared to when the import phase was conducted. As described in further detail below, the event tracking engine 132 can identify updated-data events by querying the device database 122 to identify any record(s) in one or more of the batches 220-222, among others, having a more recent version attribute than the last version attribute stored in the tracking table 124 for those record(s).

When the event tracking engine 132 identifies an updated-data event in at least one record in the device database 122, it determines which data values in the record are different or have changed, captures the new data values, and stores those new data values in the staging tables 126. In turn, the forwarding service 134 periodically references the staging tables 126 to identify whether any new data values are present. When the forwarding service 134 identifies new data values in the staging tables 126, it forwards them to the analytics computing system 170.

Figure 3A:
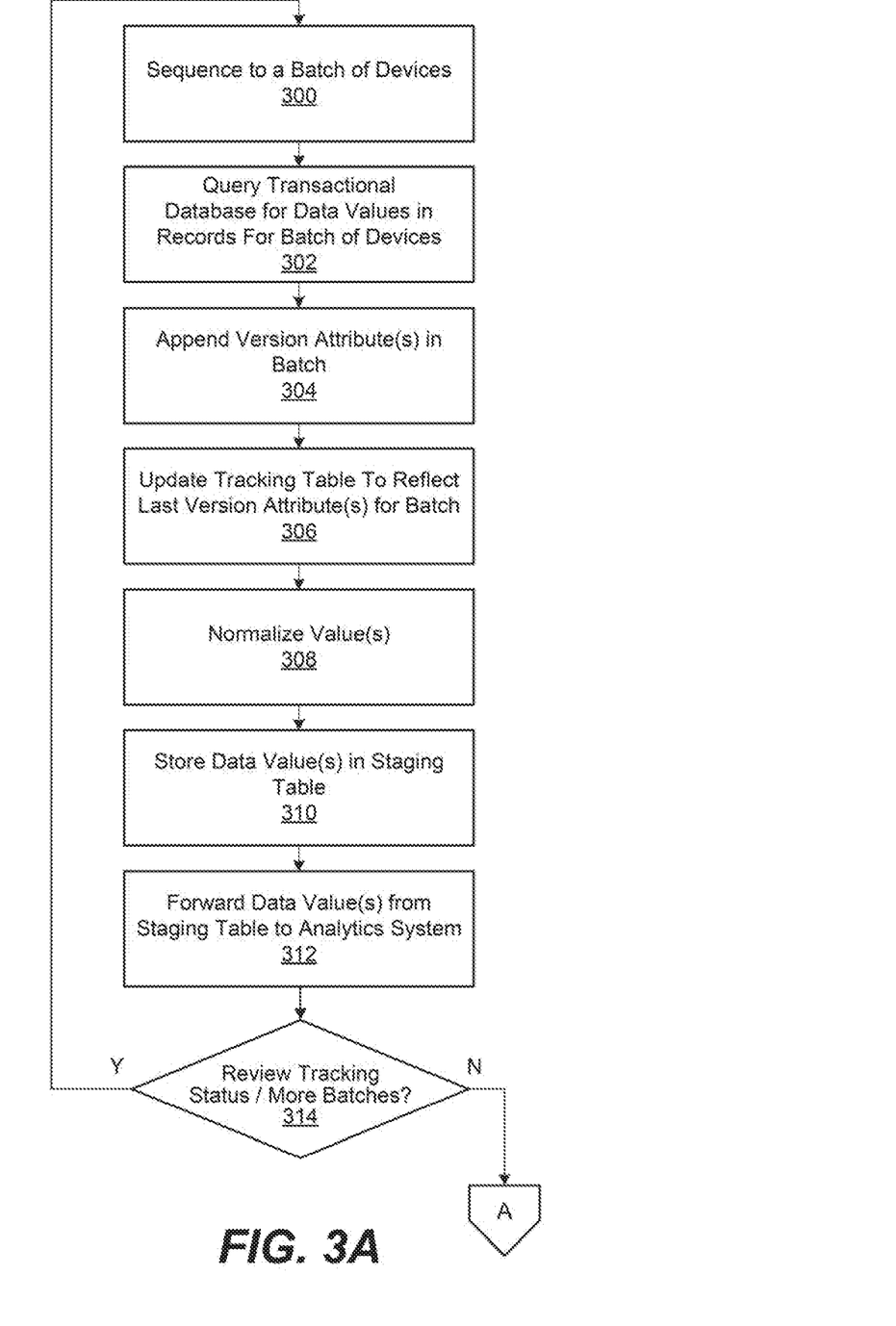
FIG. 3A illustrates an example initial import process for database synchronization according to various examples described herein.
Figure 3B:
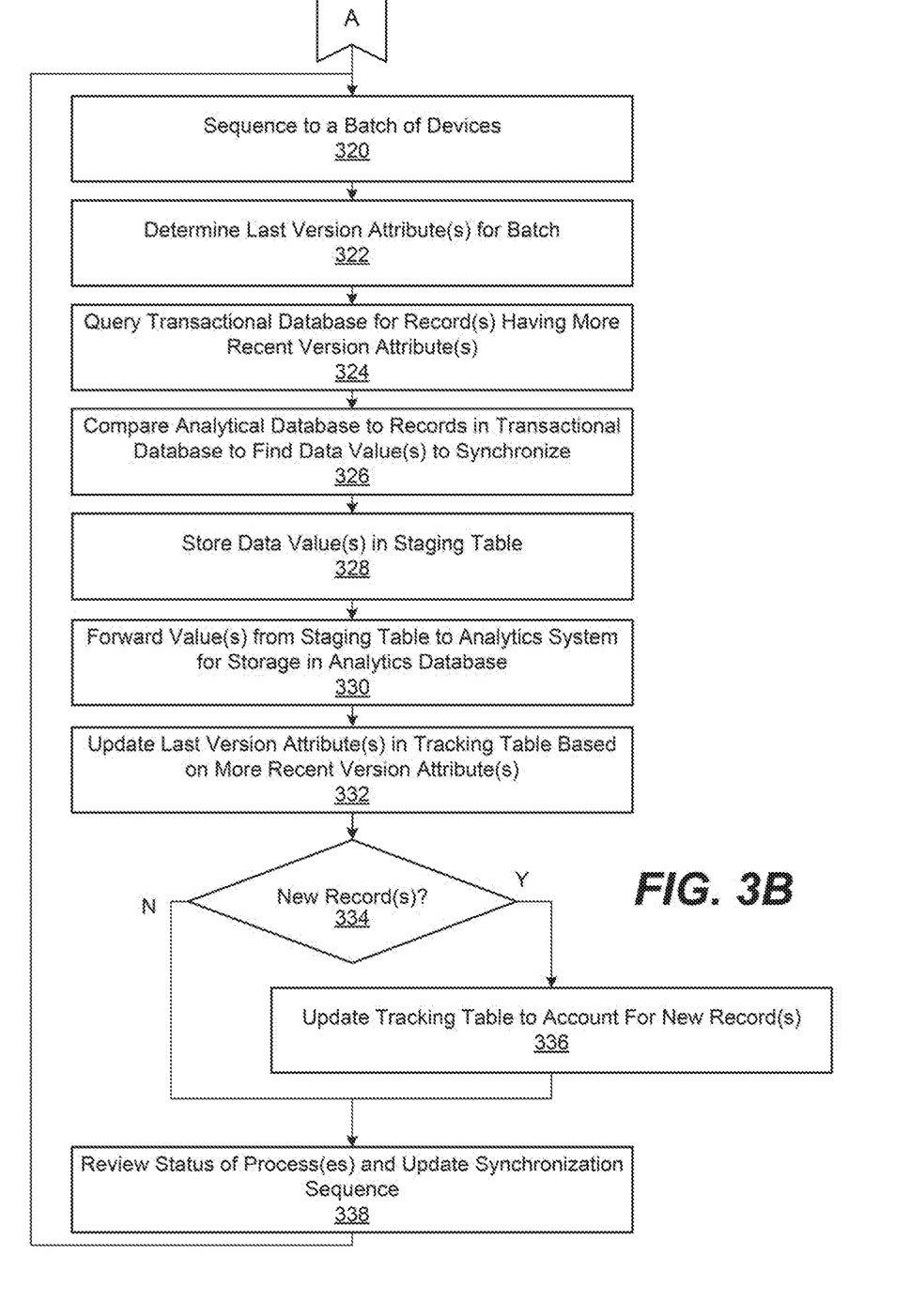
FIG. 3B illustrates an example event based process for database synchronization according to various examples described herein.

Turning to a more detailed description of the operations of the event tracking engine 132 and the forwarding service 134, FIG. 3A illustrates an example initial import process for database synchronization, and FIG. 3B illustrates an example event based process for database synchronization. The processes shown in FIGS. 3A and 3B can be performed by the event tracking engine 132 and the forwarding service 134 shown in FIG. 1. Although FIGS. 3A and 3B show an order of execution, the order of execution can differ from that which is shown. For example, the order of execution of two or more elements or steps can be switched relative to the order shown or as described below. Two or more elements shown in succession can be executed concurrently or with partial concurrence, and one or more of the elements shown in the flowcharts can be skipped or omitted. Further, while the process flow shown in FIG. 3A is provided as an example associated with processing one batch of records in the device database 122, multiple processes for a number of different batches can be processed concurrently, in which case the processing for different batches can overlap at least in part with each other.

At the outset of the process shown in FIG. 3A, it is assumed that the device database 122 has been populated by the management service 130 with data representative of various operating characteristics and settings of the client devices 160. The process in FIG. 3A is directed to the initial import process in which the data in the device database 122 is copied, in bulk, to the analytics database 182.

At step 300, the process can include the event tracking engine 132 sequencing to a batch of devices having records in a transactional database for data synchronization. In that context, the event tracking engine 132 can operate in accordance with a batch counter or tracker stored in the tracking table 124, for example, and sequence progressively among the batches of records stored in the device database 122, such as the batches 220-222. It is not necessary that the event tracking engine 132 sequence through the batches 220-222 in any particular order, but the event tracking engine 132 can be directed to sequence to each of the batches 220-222 at least once during the initial import process before turning to the event based synchronization process shown in FIG. 3B.

In some cases, the event tracking engine 132 can build a delay, such as 5, 10, 20, or more seconds, before the selection at step 300 of the next batch in the sequence. In that way, the event tracking engine 132 can avoid excessively accessing the device database 122 during the initial import process. Further, because the event tracking engine 132 can execute multiple batch processes at a time, step 300 can also include reviewing a status of any ongoing batch processes to identify which ones are queued, in progress, completed, or associated with an error status. In turn, the event tracking engine 132 can sequence to the next batch of devices based on the status of the other ongoing batch processes, so as to avoid duplicating efforts.

At step 302, the process can include the event tracking engine 132 querying the device database 122 for the data values stored in the records of the batch identified in step 300. For example, the event tracking engine 132 can query the device database 122 to return the data values stored in fields "a," "b," and "c," among others, in each of the records in the batch 200 as shown in FIG. 3A. In response to the query, the event tracking engine 132 can receive the data values from the device database 122.

At step 304, the process can include the event tracking engine 132 appending a version attribute to one or more of the records in the batch queried at step 302. As one example, each version attribute can be derived from a timestamp generated by the enterprise computing environment 100 based on when the record associated with the version attribute was last accessed by the management service 130, the event tracking engine 132, or other relevant processes of the enterprise computing environment 100. In that sense, each version attribute is representative of the last time data values in a given record were accessed, modified, or updated, for example, and each version attribute can be updated or refreshed each time any data values in the record are accessed, modified, or updated.

To append the version attribute, the event tracking engine 132 can create a new version field (e.g., field "v" in FIG. 2) in one or more of the records queried at step 302. The version attribute can then be stored under the version field in one or more of the records queried at step 302. In some cases, a version attribute is appended to each of the records in the batch of records queried at step 302. In other cases, the version attribute can be appended to less than all the records in the batch. In that case, the version attribute can be updated any time any record in the batch is accessed. In still other cases, the version attribute can be appended to only one record in the batch, and that version attribute can be associated and updated based upon access to any of the records in the batch.

At step 306, the process can include the event tracking engine 132 updating the tracking table 124 to reflect one or more of the last version attribute(s) appended to the records at step 304. For example, for each version attribute appended to one of the records at step 304, the event tracking engine 132 can update the tracking table 124 to include a copy of the version attribute. In that case, the tracking table 124 can include a copy of the version attribute of every record in the batch of records queried at step 302. In other cases, the event tracking engine 132 can identify the latest (e.g., most recent) version attribute among all the records in the batch of records, and update the tracking table 124 to include only a copy of that version attribute. As discussed in further detail below with reference to FIG. 3B, the event tracking engine 132 can reference the version attributes stored in tracking table 124 to identify which records in the device database 122 have new or updated data values.

At step 308, the process can include the event tracking engine 132 normalizing the data values received from the device database 122 at step 302. The event tracking engine 132 can normalize or flatten the data values by discarding any associated or underlying attributes, such as data type, database schema, inter-record or inter-table reference, or other attributes, from the data values. For certain attributes, rather than being discarded, the attributes can be normalized or encoded into another standard data format to be stored with the data values. The event tracking engine 132 can flatten the data values into extensible markup language (XML) strings, for example, or other suitable data formats.

After the data values are normalized at step 308, the process can include the event tracking engine 132 storing the data values to the staging tables 126 at step 310. As discussed above with reference to FIG. 2, the event tracking engine 132 can first append the data values to the end of the event staging table 230, for example, before the forwarding service 134 reviews the data values stored in the event staging table 230 and copies or moves those data values, in groups, to the jobs staging table 231.

At step 312, the process includes the forwarding service 134 forwarding data values from the staging tables 126 to the analytics computing system 170 for storage in the analytics database 182. For example, the forwarding service 134 can periodically check the event staging table 230 to identify whether any data values have been stored there by the event tracking engine 132. During the initial import process, the volume of data to be copied from the device database 122 to the analytics database of the 182 can be relatively large, and the event tracking engine 132 can be consistently storing additional data values to the event staging table 230. During the event based process (e.g., as shown in FIG. 3B), on the other hand, the volume of data values being stored to the event staging table 230 can be significantly less and, possibly, more sporadic over time.

When the forwarding service 134 identifies data values in the event staging table 230 to be forwarded to the analytics computing system 170, the forwarding service 134 can move or copy those data values, in groups, to the jobs staging table 231. The forwarding service 134 can then retrieve the data values from the jobs staging table 231 and conduct an API call to transfer the data values to the analytics computing system 170, possibly in groups, using a suitable network protocol over the network 150. When the data values are received at the analytics computing system 170, the analytics engine 190 can store the data values in the analytics database 182, which can include a number of separate or different analytics databases, each used for a different purpose.

At step 314, the process can include the event tracking engine 132 determining whether the device database 122 includes any more batches or records which have not been sequenced through in the previous steps. Because the event tracking engine 132 can execute multiple batch processes at a time, step 314 can also include reviewing a status of any ongoing batch processes to identify which ones are queued, in progress, completed, or associated with an error status. In turn, the event tracking engine 132 can determine whether any more batches or records are awaiting synchronization processing based on the status of the other ongoing batch processes. If there are no additional batches or records for processing, then the process proceeds to step 320 in FIG. 3B. Otherwise, if there are additional batches or records for processing, then the process proceeds back to step 300.

Turning to the event based process shown in FIG. 3B, it is noted that the process of FIG. 3B can be conducted after the initial import process shown in FIG. 3A is complete. At that time, it is only necessary to update the data values in the analytics database 182 when a data change event occurs at the device database 122. Such data change events can include changes in the data values of previously-reviewed records, the deletion of previously-reviewed records, or the addition of new records in the device database 122. As the event tracking engine 132 identifies such data change events, any changes to the underlying data values are synchronized to the analytics database 182 according to the process shown in FIG. 3B.

At step 320 the process can include the event tracking engine 132 sequencing to a batch of devices in the device database 122 to check for any data change events. Similar to the sequencing in step 300 in FIG. 3A, the event tracking engine 132 can operate in accordance with a batch counter or tracker stored in the tracking table 124, to sequence progressively among the batches of records stored in the device database 122. In the event based synchronization process shown in FIG. 3A, the event tracking engine 132 sequences through the batches of records to check each batch for any data change events to be synchronized with the analytics database 182. In some cases the event tracking engine 132 can build a delay, such as 5, 10, 20, or more seconds, before the selection of the next batch at step 320. In that way, the event tracking engine 132 can avoid excessively accessing the device database 122.

At step 322, the process can include the event tracking engine 132 determining, with reference to the tracking table 124, one or more last version attributes associated with data synchronization for the batch identified at step 320. For example, the event tracking engine 132 can reference the tracking table 124 to identify the last version attribute saved for the batch identified at step 320. Additionally or alternatively, the event tracking engine 132 can reference the tracking table 124 to identify a number of last version attributes saved for one or more of the records of the batch identified at step 320. In any case, because they were derived based on a timestamp generated by the enterprise computing environment 100 when data values in the batch were last synchronized, the last version attributes referenced in the tracking table 124 can be relied upon to determine whether any records in the batch include data change events.

At step 324, the process can include the event tracking engine 132 querying the device database 122 to identify one or more records of the batch identified at step 320 having a more recent version attribute than the last version attribute determined at step 322. As an example, the query to the device database 122 can be structured to return any records in the batch which have a version attribute that is later in time (e.g., more recent) than that determined at step 322. The querying at step 324 can return one or more records in a batch, such as the record 210 in the batch 220, for example, if the version attribute of the record 210 is later in time or more recent than the last version attribute determined at step 322.

Among the records having a more recent version attribute, the event tracking engine 132 is configured to determine which data values in those records are different than the corresponding data values stored in the analytics database 182. To that end, at step 326, the process can include the event tracking engine 132 comparing data stored in the analytics database 182 to the data values in the records having a more recent version attribute to find at least one data value to synchronize from the device data base 122 to the analytics database 182. Any data values in the device database 122 which are found to be different than those in the analytics database 182 can be identified as values which should be synchronized to the analytics database 182.

At step 328, the process can include the event tracking engine 132 storing the data values which need to be synchronized with the analytics database 182 to the staging tables 126. As discussed above with reference to FIG. 2, the event tracking engine 132 can first append the data values to the end of the event staging table 230, for example, before the forwarding service 134 reviews the data values stored in the event staging table 230 and copies or moves those data values, in groups, to the jobs staging table 231.

At step 330, the process can include the forwarding service 134 forwarding data values from the staging tables 126 to the analytics computing system 170 for storage in the analytics database 182. For example, the forwarding service 134 can periodically check the event staging table 230 to identity whether any data values have been stored there by the event tracking engine 132. When the forwarding service 134 identifies data values in the event staging table 230 to be forwarded to the analytics computing system 170, the forwarding service 134 can move or copy those data values, in groups, to the jobs staging table 231. The forwarding service 134 can then retrieve the data values from the jobs staging table 231 and conduct an API call to transfer the data values to the analytics computing system 170, possibly in groups, using a suitable network protocol over the network 150. When the data values are received at the analytics computing system 170, the analytics engine 190 can store the data values in the analytics database 182, which can include a number of separate or different analytics databases, each used for a different purpose.

At step 332, the process can include the event tracking engine 132 updating the tracking table 124 to reflect one or more of the last version attribute(s) of the records returned by the query at step 324. For example, for each version attribute associated with one of the records returned from the query at step 324, the event tracking engine 132 can update the tracking table 124 to include a copy of the version attribute for that record. In that case, the tracking table 124 can include a copy of the last (most recent, or latest) version attribute among the records in the batch returned by the query at step 324. This update to the last version attribute in the tracking table 124 ensures that, when the event based synchronization process sequences to the same batch identified at step 320 at a later time, the process will be able to determine whether any data change events have occurred in the batch. If so, a query to the device database 122 should return records having an even later version attribute.

At step 334, the process can include the event tracking engine 132 determining whether the device database 122 includes any records for new devices. In that context, it is noted that the management service 130 can add new records to the device database 122 over time, as new client devices 160 are enrolled in device management. Records for new devices can be identified if the number of records for devices stored in the device database 122 is greater than a field in the tracking table 124 used to track the number of records for devices in the device database 122. If new records for new devices are not found, then the process proceeds to step 338. On the other hand, if new records for new devices are found, then the process proceeds to step 336.

At step 336, the process can include the event tracking engine 132 updating the tracking table 124 to account for the new device or devices identified at step 334. The updating can include changing the field in the tracking table 124 used to track the number of records or devices in the device database 122 to account for any new devices identified at step 334.

At step 338, the process can include the event tracking engine 132 reviewing a status of one or more ongoing batch synchronization processes to identify any queued, in progress, completed, or error status processes. Based on the status of the other ongoing batch synchronization processes, the process can also include the event tracking engine 132 updating or altering the sequence for the next batch to be selected at step 320. The selection of the next batch can be made to avoid other batches for which ongoing synchronization processes are underway.

Further, at step 338, the process can include the event tracking engine 132 determining whether the tracking table 124 has been updated to identify any new devices at step 336. If so, then updating the sequence for the next batch to be selected at step 320 can direct the event tracking engine 132 to sequence to a batch including at least one device identifier of one of the new devices. In other words, the sequencing at step 320 can be directed according to an update to the sequence at step 338, to prioritize data synchronization for new records for new devices added to the device database 122. After step 338, the process proceeds back to step 320 for sequencing among additional batches of records in the device database 122.

The event based process illustrated in FIG. 3B can continue to be executed over time. While the process is executed, the event tracking engine 132 can continue to sequence through different batches of records in the device database 122 to determine whether any data change events have occurred in those records. When changes are identified, updated data values are transmitted to the analytics computing system 170 for incorporation into the analytics database 182.

The flowcharts shown in FIGS. 3A and 3B show examples of the functions and operation of the components described herein. The components described herein can be embodied in hardware, software, or a combination of hardware and software. If embodied in software, each element can represent a module or group of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function (s).

The enterprise computing environment 100 can include at least one processing circuit. Such a processing circuit can include, for example, one or more processors and one or more storage or memory that are coupled to a local interface. The local interface can include, for example, a data bus with an accompanying address/control bus or any other suitable bus structure. Similarly, the client devices 160 can include at least one processing circuit. Such a processing circuit can include, for example, one or more processors and one or more storage or memory devices that are coupled to a local interface.

The storage or memory devices can store data or components that are executable by the processors of the processing circuit. For example, the management service 130, the event tracking engine 132, the forwarding service 134, and/or other components can be stored in one or more storage devices and be executable by one or more processors in the enterprise computing environment 100.

The management service 130, event tracking engine 132, forwarding service 134, and/or other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that include software or program instructions can be embodied in any non transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

Further, any logic or applications described herein, including the management service 130, event tracking engine 132, forwarding service 134, and/or other components can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices. Additionally, terms such as "application," "service," "system," "engine," "module," and so on can be used interchangeably and are not intended to be limiting.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

What is claimed is:

1. A method for event based synchronization of data between databases, comprising:
    enrolling a plurality of devices with a management service, the management service remotely configuring operating systems of the client devices to register and configure the client devices for device management;
    sequencing, with reference to a tracking table, to a batch of records in a transactional database, the batch of records comprising a plurality of records corresponding to the plurality of devices;
    determining, with reference to the tracking table, a last version attribute associated with data synchronization for the batch;
    querying the transactional database to identify at least one record of the batch having a more recent version attribute than the last version attribute;
    comparing data in an analytics database to data in the at least one record to find at least one value to synchronize from the transactional database to the analytics database; and
    forwarding the at least one value to an analytics computing system for incorporation into an analytics database.

2. The method according to claim 1, further comprising updating the last version attribute for the batch in the tracking table to reflect the more recent version attribute associated with the at least one record from the batch.

3. The method according to claim 1, wherein the forwarding comprises:
    normalizing the at least one value;
    storing the at least one value in a staging table; and
    forwarding the at least one value from the staging table to the analytics computing system for incorporation into the analytics database.

4. The method according to claim 1, further comprising:
    determining whether the transactional database comprises a record for a new device; and
    in response the transactional database comprising the record for the new device, updating the tracking table to account for the new device.

5. The method according to claim 1, wherein the sequencing comprises:
    determining whether the tracking table identifies a new device; and
    in response to the transactional database comprising the new device, selecting the batch as a next batch for processing based on the new device, wherein the batch encompasses a device identifier of the new device.

6. The method according to claim 1, wherein the sequencing comprises:
    reviewing a status of at least one batch synchronization process to identify at least one of a queued, in progress, completed, or error status for the least one batch synchronization process; and
    selecting the batch as a next batch for processing based on the status.

7. The method according to claim 1, wherein the sequencing comprises:
    reviewing a timing associated with a status of at least one batch synchronization process; and
    selecting the batch as a next batch for processing based on the timing and a frequency for batch synchronization processes.

8. The method according to claim 1, further comprising importing data values from records in the transactional database to the analytics database.

9. The method according to claim 8, wherein the importing comprises:
    appending a version attribute to at least one record in the transactional database for the batch; and
    updating the tracking table to incorporate the version attribute as the last version attribute associated with data synchronization for the batch.

10. A non-transitory computer-readable medium embodying program code executable in at least one computing device for event based synchronization of data between databases that, when executed by the at least one computing device, directs the at least one computing device to at least:
    enroll a plurality of devices with a management service, the management service remotely configuring operating systems of the client devices to register and configure the client devices for device management;
    sequence to a batch of records in a transactional database, the batch of records comprising a plurality of records corresponding to the plurality of devices;
    determine a last version attribute associated with data synchronization for the batch;
    query the transactional database to identify at least one record of the batch having a more recent version attribute than the last version attribute;
    compare data in an analytics database to data in the at least one record to find at least one value to synchronize from the transactional database to the analytics database; and
    forward the at least one value for incorporation into an analytics database.

11. The non-transitory computer-readable medium according to claim 10, wherein the at least one computing device is further directed to at least update the last version attribute for the batch in a tracking table to reflect the more recent version attribute associated with the at least one record from the batch.

12. The non-transitory computer-readable medium according to claim 10, wherein the at least one computing device is further directed to at least:
normalize the at least one value;
store the at least one value in a staging table; and
forward the at least one value from the staging table to an analytics computing system for incorporation into the analytics database.

13. The non-transitory computer-readable medium according to claim 10, wherein the at least one computing device is further directed to at least:
determine whether the transactional database comprises a record for a new device; and
in response to the transactional database comprising the record for the new device, update a tracking table to account for the new device.

14. The non-transitory computer-readable medium according to claim 10, wherein the at least one computing device is further directed to at least:
review a status of at least one batch synchronization process to identify at least one of a queued, in progress, completed, or error status for the least one batch synchronization process; and
select the batch as a next batch for processing based on the status.

15. A system for event based synchronization of data between databases, comprising:
a memory device configured to store computer-readable instructions thereon; and
at least one processing device configured, through execution of the computer-readable instructions, to at least:
enroll a plurality of devices with a management service, the management service remotely configuring operating systems of the client devices to register and configure the client devices for device management;
sequence to a batch of records in a transactional database, the batch of records comprising a plurality of records corresponding to the plurality of devices;
determine a last version attribute associated with data synchronization for the batch;
query the transactional database to identify at least one record for the batch having a more recent version attribute than the last version attribute; compare data in an analytics database to data in the at least one record to find at least one value to synchronize from the transactional database to the analytics database; and
forward the at least one value for incorporation into an analytics database.

16. The system according to claim 15, wherein the at least one processing device is further configured to at least update the last version attribute for the batch in a tracking table to reflect the more recent version attribute associated with the at least one record from the batch.

17. The system according to claim 15, wherein the at least one processing device is further configured to at least:
normalize the at least one value;
store the at least one value in a staging table; and
forward the at least one value from the staging table to an analytics computing system for incorporation into the analytics database.

18. The system according to claim 15, wherein the at least one processing device is further configured to at least:
determine whether the transactional database comprises a record for a new device; and
in response to the transactional database comprising the record for the new device, update a tracking table to account for the new device.

19. The system according to claim 15, wherein the at least one processing device is further configured to at least:
determine whether the transactional database comprises a record for a new device; and
in response to the transactional database comprising the new device, select the batch as a next batch for processing based on the new device, wherein the batch encompasses a device identifier of the new device.

20. The system according to claim 18, wherein the at least one processing device is further configured to at least:
review a status of at least one batch synchronization process to identify at least one of a queued, in progress, completed, or error status for the least one batch synchronization process; and
select the batch as a next batch for processing based on the status.

* * * * *